Dec. 4, 1928.
1,693,835
C. E. BRADLEY ET AL
FASTENER COVERING AND METHOD OF MAKING SAME
Filed Sept. 3, 1927
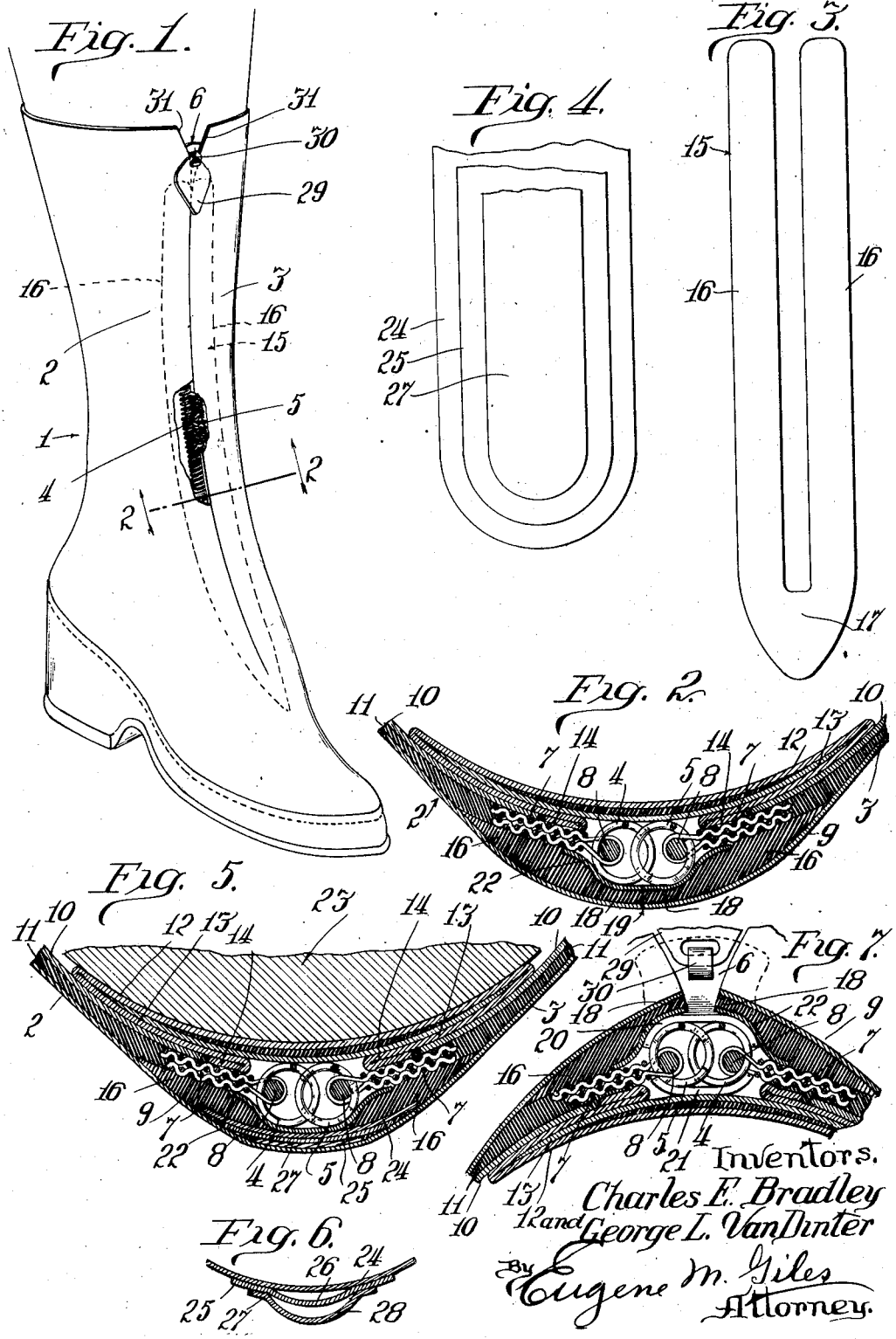

Patented Dec. 4, 1928.

1,693,835

UNITED STATES PATENT OFFICE.

CHARLES E. BRADLEY AND GEORGE L. VAN DINTER, OF MISHAWAKA, INDIANA, ASSIGNORS TO MISHAWAKA RUBBER AND WOOLEN MANUFACTURING COMPANY, OF MISHAWAKA, INDIANA, A CORPORATION OF INDIANA.

FASTENER COVERING AND METHOD OF MAKING SAME.

Application filed September 3, 1927. Serial No. 217,522.

Our invention relates to fastening devices wherein the edges of the connected parts are brought together over the fastener to conceal the latter, and has reference more particularly to the construction of the meeting edges so as to insure a flush and snugly abutting relation.

In many articles, as for example, overshoes and other footwear, wherein flexible parts are detachably connected, it is desirable that the parts close together snugly in an edge to edge manner and permit flexing and bending of the joint without separation of the abutting edges or displacement out of alignment. Such a construction not only enhances the appearance of the article by concealing the fastening device and providing a neat and smooth surface at the joint, but it also serves to protect the fastener against damage or injury and excludes dirt and other matter which might interfere with the proper operation of the fastener. While our present invention may be advantageously employed with various kinds of fasteners, it is particularly applicable to fasteners of the slider operated type which afford a substantially continuous connection between the parts, one form of such a fastener being shown in our application Serial No. 36,587, filed June 12, 1925, which involves a fastener covering somewhat similar to our present invention.

The principal objects of our invention are to insure a snug closing together of the edges of the connected parts; to maintain the closely abutting relation of the edges without displacement when the parts are flexed and bent along the juncture line; to insure a flush or accurate edge to edge engagement whereby a smooth continuous surface and inconspicuous line of separation is presented at the joint; to provide an improved method of accomplishing the snugly abutting and accurate edge to edge engagement of the parts; and in general, to provide a simple and convenient construction which effectively maintains the edges of the parts in flush close abutting relation when the parts are connected.

On the drawing:—

Fig. 1 is a perspective view of an overshoe or arctic embodying our invention and having portions broken away to disclose details of the construction;

Fig. 2 is an enlarged sectional view on the line 2—2 of Fig. 1;

Fig. 3 is a plan view of the filler and reinforcing which is located at opposite sides of the gap;

Fig. 4 is a plan view of a portion of the laminated covering for the fastener;

Fig. 5 is a view similar to Fig. 2, showing the parts as assembled before vulcanizing;

Fig. 6 is a sectional view of the laminations or layers of rubber composition, showing the manner in which they are assembled with extra fullness in the outer layers to insure a snug fitting at the outer surface; and Fig. 7 is a sectional view similar to Fig. 2, and showing the slider and adjoining parts in perspective.

Referring to the drawing, we have shown our invention as applied to an overshoe and in connection with a slider operated fastener, although it is to be understood that it may be used on other articles and in connection with fasteners of other kinds. The reference numeral 1 indicates an arctic or overshoe as a whole, which is divided down the front to form separable side portions 2 and 3, having fastening members 4 and 5 respectively on the forward edges thereof which are adapted to be interlocked and released by movement of a cam member or slider 6 therealong.

The fastener members 4 and 5 and the operating slider 6 may be of any suitable type and may be attached to the separable parts in any convenient manner. In the illustrated structure however, we have shown a fastener of the coil spring type, wherein the successive coils or convolutions of each spring serve as fastener elements and nest between the coils or convolutions of the other spring, the coils of one of the springs being of wave like formation or provided with offsets to effect a substantial interlocking of the opposed coils.

For securing the coils to the side portions or quarters of the overshoe or artic, tapes 7 are preferably employed, said tapes being doubled over around a cord 8, passing lengthwise through the respective spring, and the two sides of the tape are secured together in any convenient manner to retain the cord 8 and spring in the folded edge and afford a two-ply stringer for attaching the fastener elements to the separable parts of the shoe or other article.

The overshoe upper is composed of an outer covering or facing 9, and a lining 10 with a layer 11 of rubber composition interposed therebetween, and a tape 7 is secured to the forward edge of each side portion of the lining 10, as shown particularly in Figs. 2 and 5. It is a common practice to use a tongue of bellows type in the overshoe, and this tongue which is indicated at 12, has lateral portions 13 folded back over the front, and the inner edges of the portions 13 are folded back as indicated at 14, and secured to the respective stringer or tape 7.

A filler and reinforcing member of rubber composition indicated as a whole at 15 in Fig. 3, comprising spaced side portions 16—16 and an end connection 17 and tapering to a feather edge at the upper and lower ends and at the sides, is located as shown in Fig. 5, so that the side portions 16—16 are at opposite sides respectively of the fastener and fill the corner recesses between the tapes 7 and their respective springs and a covering portion 18 slit at 19 directly over the line of separation of the fastener 4—5 forms a continuation of the sides 16—16 of the filler and extends over the fastener. The covering 18—18 in the present case is built up of layers of rubber composition, the outermost layers of which are arranged with extra fullness between the lateral edges so that when consolidated in a unitary structure, the outermost portions of the covering have ample stock to close together snugly and afford a neat and inconspicuous line of separation without any tendency to pull apart or open up when the fasteners 4 and 5 are connected.

The slider 6 is of the usual type, comprising front and rear plates 20 and 21 respectively, with divergent channels therebetween for the springs 4 and 5 and operates along the fasteners 4 and 5 and between the tongue 12 and the covering 18—18 to interlock and release the fastener. To facilitate operation of the slider a thin strip 22 of fabric is preferably provided on the under side of the covering 18—18, so that the slider does not operate in direct contact with the rubber composition which forms the covering.

In constructing the overshoe or arctic with our improved fastener covering, the bellows tongue 12 and lining 10 and interlocked fastener 4—5 is assembled and then applied on the last, the tapes 7 being secured to the outturned edges 14 and the forward edges of the lining as shown in Fig. 5. The strip 22 is then applied over the interlocked fastener with the lateral edges extending over and secured to the tapes 7, after which the filler and reinforcing member 15, which is preferably performed, is applied as shown in Fig. 5 and secured in place with the side portions 16—16 filling the corner spaces between the tapes 7 and their respective springs 4 or 5 and with the connecting portion 17 located at the lower end of the interlocked fastener. Since the marginal edges of this filler 15 are tapered to a feather edge, it slopes gradually away from the fastener so that the latter does not form an abrupt portion on the outer surface of the overshoe.

After the filler 15 has been located in place, a laminated covering of rubber composition is placed over the interlocked fastener and strip 22, with the lateral edges of the covering extending over and secured to the portions 16—16 of the filler. This laminated covering may be prepared and applied as a unit to the assembled overshoe structure or the layers of rubber composition may be assembled one at a time on the overshoe structure. In either case however, the outer layers or laminations are arranged with extra fullness between the lateral edges so as to naturally assume an arched form and with the maximum fullness in the outermost layer, as shown substantially in Fig. 6, so that when the structure is completed there is ample material or stock in the outermost portion of the covering to insure a snug closing together of the divided portions of the covering without any gap occurring therebetween.

In providing the extra fullness above referred to the innermost layer 24 is first arranged in position, after which the next layer 25, which is narrower than the layer 24, is placed in position over the first layer, preferably with a central bulge as indicated at 26, which is subsequently flattened down after the lateral edges of the layer 25 have been secured to the layer 24. The outer layer 27, which is of less width than the intermediate layer 25, is then secured to the intermediate layer 25 in like manner with a central bulge 28, which is flattened down against the intermediate layer 25 after the lateral edges have been secured in place. After the laminated structure 24, 25, 27 has been applied in place as shown in Fig. 5, the outer facing 9 of the overshoe is applied thereover and secured to the exterior of the overshoe structure with a layer 11 of rubber composition between the outer facing and the lining.

After the overshoe has been completely assembled on the last, it is then vulcanized in the usual manner and in the vulcanizing process the layers 24, 25 and 27 are consolidated with one another and with the sides 16 of the filler 15 affording a structure as shown in Fig. 2, and after the vulcanizing is completed, the facing 9, rubber covering 18—18 and the inner strip 22 are split as indicated at 19 in Fig. 2, directly over the line of separation of the fastener 4 and 5, and with the covering built up as indicated hereinbefore the outer portions of the rubber covering 18—18 are sufficiently relaxed and have sufficient fullness to close together snugly along the line of separation 19, and the portions of the facing 9 adjacent the line of separation, being secured to the rubber covering, are held in closely abutting relation, affording a neat and inconspicuous line of separation.

It will be understood that the making up of the covering 18—18 of a plurality of layers permits each layer to be individually shaped, without strain, to conform to the surface over which it is applied and results in a close fitting of the edges 18—18 at the outer surface of the overshoe. By applying the successive layers however, as hereinbefore described, with extra fullness or a central bulge between the lateral edges, an even better abutting relation of the edges 18—18 is afforded as the flattening out of the bulge crowds the material toward the center and assures ample stock to cause the edges 18—18 to butt together very snugly and securely. The number of layers or laminations shown herein makes a satisfactory construction, but the number of layers may be varied if desired.

The slider 6 has a pull or finger grip 29 secured thereto by a connector 30 for operating the slider, the connector being preferably located adjacent the upper or wider end of the slider at a point where the fasteners 4 and 5 and the edges 18—18 are spread apart somewhat in the operation of the slider as this affords a passage between the edges 18—18 for the connector 30. Moreover the covering edges 18—18 are preferably cut away at the upper end of the overshoe as indicated at 31, to afford a space therebetween for the connector 30 when the fastener is closed and the slider is in the uppermost position.

While we have shown and described our invention in a preferred form, we are aware that various changes and modifications may be made without departing from the principles of our invention, the scope of which is to be determined by the appended claims.

We claim as our invention:

1. The combination of separable parts and a fastening device for connecting same, said parts being provided with extended edge portions adapted to be brought together in edgewise abutting relation in the operation of said fastener so as to cover the latter, said extended edge portions being formed of material crowded into a space of less width than the width of said material in its normal relaxed condition, to afford extra fullness along and transverse to the line of separation and thereby effect a snug abutting of the edges when the parts are fastened together.

2. The combination of separable parts and a fastening device for connecting same, said parts being provided with extended edge portions adapted to be brought together in edgewise abutting relation in the operation of said fastener so as to cover the latter, said extended edge portions being formed at their outer sides with material crowded into a space of less width than the width of said material in its normal relaxed condition, to afford extra fullness along and transverse to the line of separation and thereby effect a snug abutting of the edges when the parts are fastened together.

3. The combination of separable parts and a fastening device for connecting same, said parts being provided with extended edge portions adapted to be brought together in edgewise abutting relation in the operation of said fastener so as to cover the latter, said extended edge portions being formed of flexible material crowded into a space of less width than the width of said material in its normal relaxed condition whereby said edge portions are of increasing fullness from the inner side to the outer side thereof and said fullness extending along and transverse to the line of separation and serving to effect a snug abutting of the edges when the parts are fastened together.

4. The combination of separable parts and a fastening device for connecting same, said parts being provided with extended edge portions adapted to be brought together in edgewise abutting relation in the operation of said fastener so as to cover the latter, said extended edge portions being formed of superposed layers of material each individually shaped to conform to the underlying surface and each superposed layer being crowded into a space of less width than the width of such layer in its normal relaxed condition.

5. The combination of separable parts and a fastening device for connecting same, said parts being provided with extended edge portions adapted to be brought together in edgewise abutting relation in the operation of said fastener so as to cover the latter, said extended edge portions being formed of a plurality of superposed layers of material and said layers being of successively increased fullness along and transverse to the line of separation with the successive layers crowded into a space of less width than the width of the respective layer in its normal relaxed condition to effect a snug abutting of the edges when the parts are fastened together.

6. The combination of separable parts and a fastening device for connecting the same, said parts being provided with extended edge portions adapted to be brought together in edgewise abutting relation in the operation of said fastener so as to cover the latter, said extending edge portions being formed of a plurality of superposed layers of rubber composition.

7. The combination of separable parts and a fastening device for connecting same, said parts being provided with extended edge portions adapted to be brought together in edgewise abutting relation in the operation of said fastener so as to cover the latter, said extended edge portions being formed of superposed layers of rubber composition consolidated into a unitary mass.

8. The combination of separable parts and a fastening device for connecting same, said parts being provided with extended edge portions adapted to be brought together in edgewise abutting relation in the operation of said fastener so as to cover the latter, said extended portions being formed of a plurality of layers of rubber composition and each layer having a greater amount of fullness transverse to the line of separation of the edges than the preceding layer and said layers being consolidated into a unitary mass.

9. The combination of separable parts and a fastening device for connecting same, said parts being provided with extended edge portions adapted to be brought together in edgewise abutting relation in the operation of said fastener so as to cover the latter, said extended edge portions being formed of a plurality of successively narrower layers of material.

10. The combination of separable parts and a fastening device for connecting same, said parts being provided with extended edge portions adapted to be brought together in edgewise abutting relation in the operation of said fastener and form an arched covering over the latter, said extended edge portions being formed of flexible material crowded into a space of less width than the width of such material in its normal relaxed condition so as to have greater fullness at the outer side than at the inner side along and transverse to the line of separation.

11. The method of covering a fastening device for separable parts, which comprises forming a covering of separable edgewise abutting portions and crowding the material of said portions into a space of less width than the width of such material in its normal relaxed condition, so as to afford extra fullness in said covering adjacent the outer surface and along and transverse to the line of separation of said covering.

12. The method of covering a fastener device for separable parts, which comprises securing a covering in place over the fastening device and crowding the material of said covering into a space of less width than the width of such material in its normal relaxed condition, so as to afford extra fullness in the covering adjacent the outer surface and along and transverse to the line of separation of the fastener device, and then dividing the covering along the line of separation of the fastening device.

13. The method of forming a covering for a fastener device whereby separable parts are detachably connected, which comprises securing a plurality of layers of material in place over the device while fastened, and crowding the successive layers into a space of less width than the width of the respective layer in its normal relaxed condition so as to provide each layer with a greater amount of fullness transverse to the line of separation than the preceding layer, and then dividing the covering to permit separation of said parts.

14. The method of forming a covering for a fastener device whereby separable parts are detachably connected, which comprises securing a covering of successively narrower strips in place over the device while fastened and then slitting the covering to permit separation of said parts.

15. The method of forming a covering for a fastener device whereby separable parts are detachably connected, which comprises securing a covering composed of layers of rubber composition in place over the device while fastened, and then dividing the covering to permit separation of said parts.

16. The method of forming a covering for a fastener device whereby separable parts are detachably connected, which comprises securing a laminated covering of rubber composition in place over the device while fastened and then dividing the covering to permit separation of said parts.

17. The method of forming a covering for a fastener device whereby separable parts are detachably connected which comprises securing a covering consisting of successive layers of rubber composition in place over the device while fastened so that each successive layer has greater fullness than the preceding layer along and transverse to the line of separation, then consolidating the layers of rubber composition into a unitary mass and then dividing the covering to permit separation of said parts.

18. The method of forming a covering for a fastening device whereby separable parts are detachably connected, which comprises forming a covering of successive layers of rubber composition with the material of the outer layers crowded toward the center, then consolidating the layers of material into a unitary mass, and then dividing the covering to permit separation of said parts.

CHARLES E. BRADLEY.
GEORGE L. VAN DINTER.